US 7,541,907 B2

(12) United States Patent
Wang et al.

(10) Patent No.: US 7,541,907 B2
(45) Date of Patent: Jun. 2, 2009

(54) AUTO-ALIGNING AND CONNECTING STRUCTURE BETWEEN ELECTRONIC DEVICE AND ACCESSORY

(75) Inventors: Yi-Shen Wang, Taoyuan (TW); John C. Wang, Taoyuan (TW)

(73) Assignee: High Tech Computer Corp., Taoyuan, Taoyuan Hsien (TW)

( * ) Notice: Subject to any disclaimer, the term of this patent is extended or adjusted under 35 U.S.C. 154(b) by 105 days.

(21) Appl. No.: 11/484,935

(22) Filed: Jul. 12, 2006

(65) Prior Publication Data

US 2007/0103266 A1 May 10, 2007

(30) Foreign Application Priority Data

Nov. 7, 2005 (TW) ............... 94139006 A

(51) Int. Cl.
*H01F 7/02* (2006.01)
(52) U.S. Cl. .................. 335/305; 335/214; 335/225; 335/228; 335/234; 335/250; 335/262; 335/274; 335/285; 335/296
(58) Field of Classification Search ............ 335/214, 335/225, 228–230, 234, 250, 274, 275, 296, 335/305, 262, 285
See application file for complete search history.

(56) References Cited

U.S. PATENT DOCUMENTS

| | | | | |
|---|---|---|---|---|
| 4,287,676 A | * | 9/1981 | Weinhaus | 40/661.01 |
| 5,701,113 A | * | 12/1997 | Edberg | 335/285 |
| 5,844,543 A | * | 12/1998 | Tamura et al. | 345/156 |
| 6,452,761 B1 | * | 9/2002 | Carey et al. | 360/320 |
| 6,501,203 B2 | * | 12/2002 | Tryggvason | 310/90.5 |
| 6,566,992 B1 | * | 5/2003 | Vicentelli | 335/306 |
| 6,653,919 B2 | * | 11/2003 | Shih-Chung et al. | 335/207 |
| 6,687,518 B1 | * | 2/2004 | Park | 455/575.1 |
| 6,929,291 B2 | * | 8/2005 | Chen | 292/251.5 |
| 2004/0129587 A1 | * | 7/2004 | Lax et al. | 206/308.2 |
| 2005/0194843 A1 | * | 9/2005 | Korenaga | 310/12 |
| 2006/0046792 A1 | * | 3/2006 | Hassemer et al. | 455/575.1 |
| 2006/0133625 A1 | * | 6/2006 | Adams et al. | 381/120 |
| 2006/0242876 A1 | * | 11/2006 | Davide | 40/779 |
| 2006/0265732 A1 | * | 11/2006 | Nakanishi et al. | 725/136 |
| 2008/0259036 A1 | * | 10/2008 | Mixdorf | 345/168 |

FOREIGN PATENT DOCUMENTS

| CN | 2606918 | 3/2004 |
|---|---|---|
| CN | 2609040 | 3/2004 |

\* cited by examiner

*Primary Examiner*—Elvin G Enad
*Assistant Examiner*—Mohamad A Musleh
(74) *Attorney, Agent, or Firm*—Kinney & Lange, P.A.

(57) ABSTRACT

An auto-aligning and connecting structure used to connect and align an electronic device and an accessory, wherein a plurality of first magnetic bodies are disposed on a first surface of the electrical device and a plurality of second magnetic bodies are disposed on a second surface of the accessory. The magnetic pole of the first magnetic bodies and the second magnetic bodies are appropriately arranged so the first magnetic bodies and the second magnetic bodies can attract each other when the first surface and the second surface approach each other. Then, the electronic device and the accessories are connected to each other when the first surface and the second surface connect.

9 Claims, 4 Drawing Sheets

AUTO-ALIGNING AND CONNECTING STRUCTURE BETWEEN ELECTRONIC DEVICE AND ACCESSORY

RELATED APPLICATIONS

The present application is based on, and claims priority from, Taiwan Application Serial Number 94139006, filed Nov. 7, 2005, the disclosure of which is hereby incorporated by reference herein in its entirety.

BACKGROUND

1. Field of Invention

The present invention relates to an auto-aligning and connecting structure. More particularly, the present invention relates to an auto-aligning and connecting structure between an electronic device and an accessory.

2. Description of Related Art

With the popularization of personal computers, electronic devices have continued to develop and flourish substantially in recent years. Conventional personal computers integrate many functions, such as video or audio signal playing, image data processing, and network communications, etc. However, conventional personal computers are often too heavy and bulky. As a result, many portable electronic devices have been created for more convenient and specialized use, including MP3 players, digital cameras, cellular phones, and personal digital assistants (PDAs).

Recent advances in the design and fabrication of both software and hardware have generated a trend to integrate these mini-sized portable electronic devices into one single apparatus. For example, smart phones and PDAs are equipped not only with the functions of a normal cellular phone but also with digital cameras, music players etc. Portable electronic devices are becoming users' portable personal computers.

Since portable electronic devices have become smaller and lighter, it is foreseeable that more and more portable electronic device accessories will be designed to increase the accessibility and functionality of the devices. These accessories may also protect portable electronic devices from wear and tear. An external keyboard or a protective cover for the electronic device are examples.

No matter what kind of accessory is used, it must be physically compatible with the electronic device. For instance, a protective cover needs to cover the surface of the electronic device closely. Furthermore, some accessories need to be coupled electrically to the device's internal circuits at a predetermined and fixed angle for precise coupling. For example, a keyboard needs to couple electrically with the electronic device in a specific direction so that the keyboard can work as an interface of the electronic device. Therefore, this kind of accessory requires not only a proper connection but also the correct alignment.

Traditionally, connectors were utilized to facilitate the connection between the electronic device and the accessory of the electronic device. However, for some electronic devices and their accessories, the connectors such as mortises and tenon joints are too complicated to manufacture, too fragile, and too large. These connectors can no longer satisfy the connectivity and alignment needs of modern electronic devices and their associated accessories.

For the forgoing reasons, there is a need for a novel connecting and aligning structure that is small, light, and easy to fabricate to connect modern electronic devices to their accessories.

SUMMARY

The present invention provides an auto-aligning and connecting structure that facilitates the connection between an electronic device and an accessory. The structure is small, light, easy to fabricate, sturdy, and it allows users to connect and disconnect accessories from electronic devices in a quick and proper manner.

In accordance with the foregoing and other aspects of the present invention, an auto-aligning and connecting structure is provided that comprises a first surface installed with a plurality of first magnetic units, and a second surface installed with a plurality of second magnetic units. When the second surface approaches the first surface, some of the plurality of the second magnetic units and some of the first magnetic units are aligned and mutually attracted such that the second surface is attracted to connect to the first surface.

In the foregoing, it is seen that the mutual attraction between the first magnetic units and the second magnetic units facilitates the alignment and connection between the electronic device and its accessory.

In conclusion, the invention facilitates the connection between an electronic device and its accessory with the help of a simple structure adopting magnetic units.

Moreover, the invention implements alignment between the electronic device and its accessory with the help of the same simple structure adopting magnetic units.

In this auto-aligning and connecting structure, a magneto-resistance layer could further be provided to cover each of the first magnetic units and the second magnetic units for reducing interference with other electronic components and for improving practicability of the present auto-aligning and connecting structure.

These and other features, aspects, and advantages of the present invention will become better understood with reference to the following description, figures, and appended claims.

Is It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
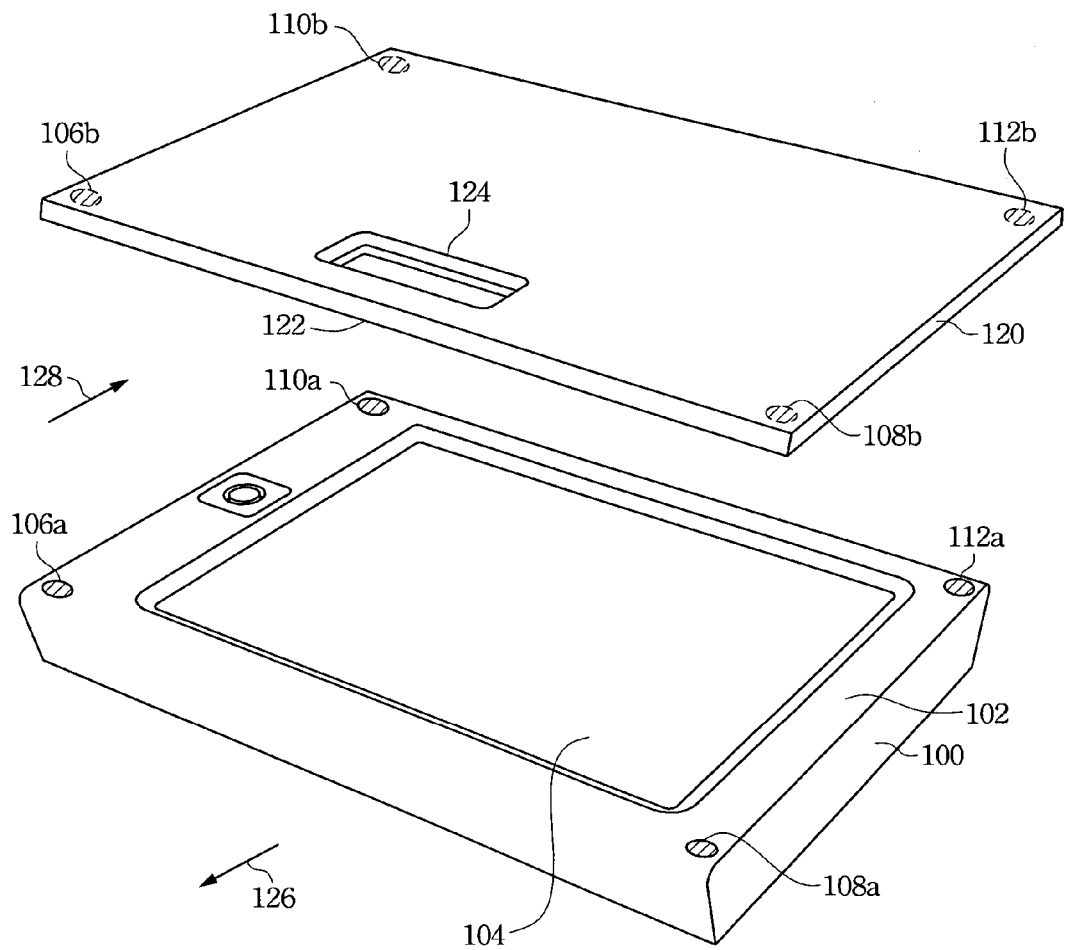
FIG. 1A is a diagram of an auto-aligning and connecting structure according to one preferred embodiment of this invention.

An auto-aligning and connecting structure utilizing magnetic units and the related arrangement for implementing the alignment is herein introduced to solve the problems in the prior art.

Reference will now be made in detail to the present preferred embodiments of the invention, examples of which are illustrated in the accompanying drawings. Wherever possible, the same reference numbers are used in the drawings and the description to refer to the same or like parts.

FIG. 1A illustrates an embodiment of the auto-aligning and connecting structure of the present invention. A portable electronic device 100 and its protective cover 120 are used to implement the embodiment.

It is observed in FIG. 1A that a display 104 is set on a first surface 102 of the electronic device 100. The portability of the electronic device 100 makes the display 104 more susceptible to damage. Hence a display protective cover 120 is needed to protect the display 104. The display protective cover 120 has to be fixed at a specific position on the first surface 102 of the electronic device 100 to cover the whole display 104 and to provide sufficient protection to the display 104. Therefore, in the present embodiment, the first magnetic units 106a, 108a, 110a and 112a comprise any kind of magnetic material, such as magnetic material, magnet, magnetic susceptible material, or electromagnetic inductive material, and the magnetic units 106a, 108a, 110a and 112a are set around the display 104.

There are an equivalent number of second magnetic units 106b, 108b, 110b and 112b set on a second surface 122 of the display protective cover 120 that covers the display 104. The magnetism of the second magnetic units 106b, 108b, 110b, and 112b are opposite to the magnetism of the first magnetic units 106a, 108a, 110a, and 112a, respectively. For instance, if the magnetism of the first magnetic units 106a, 108a, 110a and 112a are all positive, the magnetism of the second magnetic units 106b, 108b, 110b and 112b are all negative. In this way, when the second surface 122 of the display protective cover 120 and the first surface 102 of the electronic device 100 approach each other, they will be attracted to each other and connect with each other through the connection between the first magnetic unit 106a and the second magnetic unit 106b, the first magnetic unit 108a and the second magnetic unit 108b, the first magnetic unit 110a and the second magnetic unit 110b, and the first magnetic unit 112a and the second magnetic unit 112b, as demonstrated in FIG. 1B.

With an appropriate arrangement of the magnetisms, the aforementioned magnetic units are not only connecting structures that connect objects, but also aligning structures.

Please refer to FIG. 1A again. There is a window 124 on the display protective cover 120 for the user to observe the display status of the display 104 when the display protective cover 120 is connected to and covering the display 104. If the electronic device 100 is designed such that the window 124 may be positioned in the direction 126 or the direction 128 when the display protective cover 120 is shut to the first surface 102, the magnetisms of the first units 106a and 112a can be positive, and the magnetism of the first units 108a and 110a can be negative, while the magnetisms of the second units 106b and 112b can be negative, and the magnetism of the first units 108b and 110b can be correspondingly positive.

Hence the display protective cover 120 can successfully connect to the electronic device 100 whether in the direction 126 or in the direction 128.

Figure 1B:
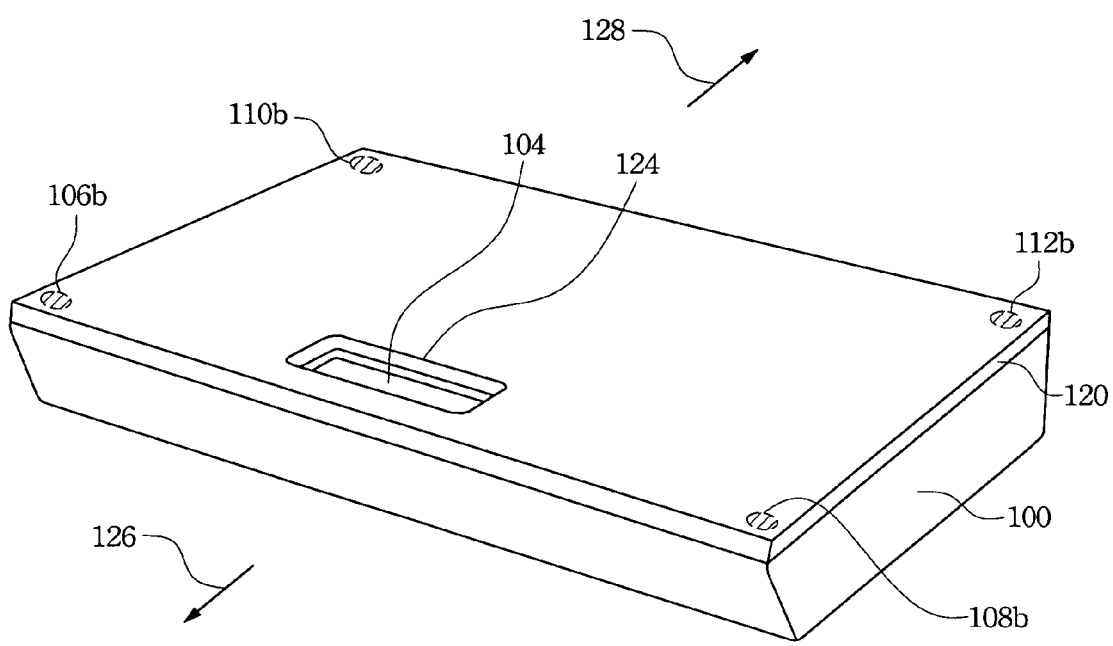
FIG. 1B is an assembly diagram of an electronic device and a display protective cover according to one preferred embodiment of this invention.

However, if the electronic device 100 is designed such that the window 124 can be positioned only in the direction 126 as illustrated in FIG. 1B, the magnetisms of the first units 106a and 108a can be positive, and the magnetisms of the first units 110a and 112a negative, while the magnetisms of the second units 106b and 108b can be negative, and the magnetisms of the first units 110b and 112b correspondingly positive. Hence the display protective cover 120 can be successfully connected to the electronic device 100 only in the direction 126. The display protective cover 120 will be repulsed and not able to connect to the electronic device 100 when the window 124 is rotated near the direction 128. Hence the alignment is accomplished.

Figure 2A:
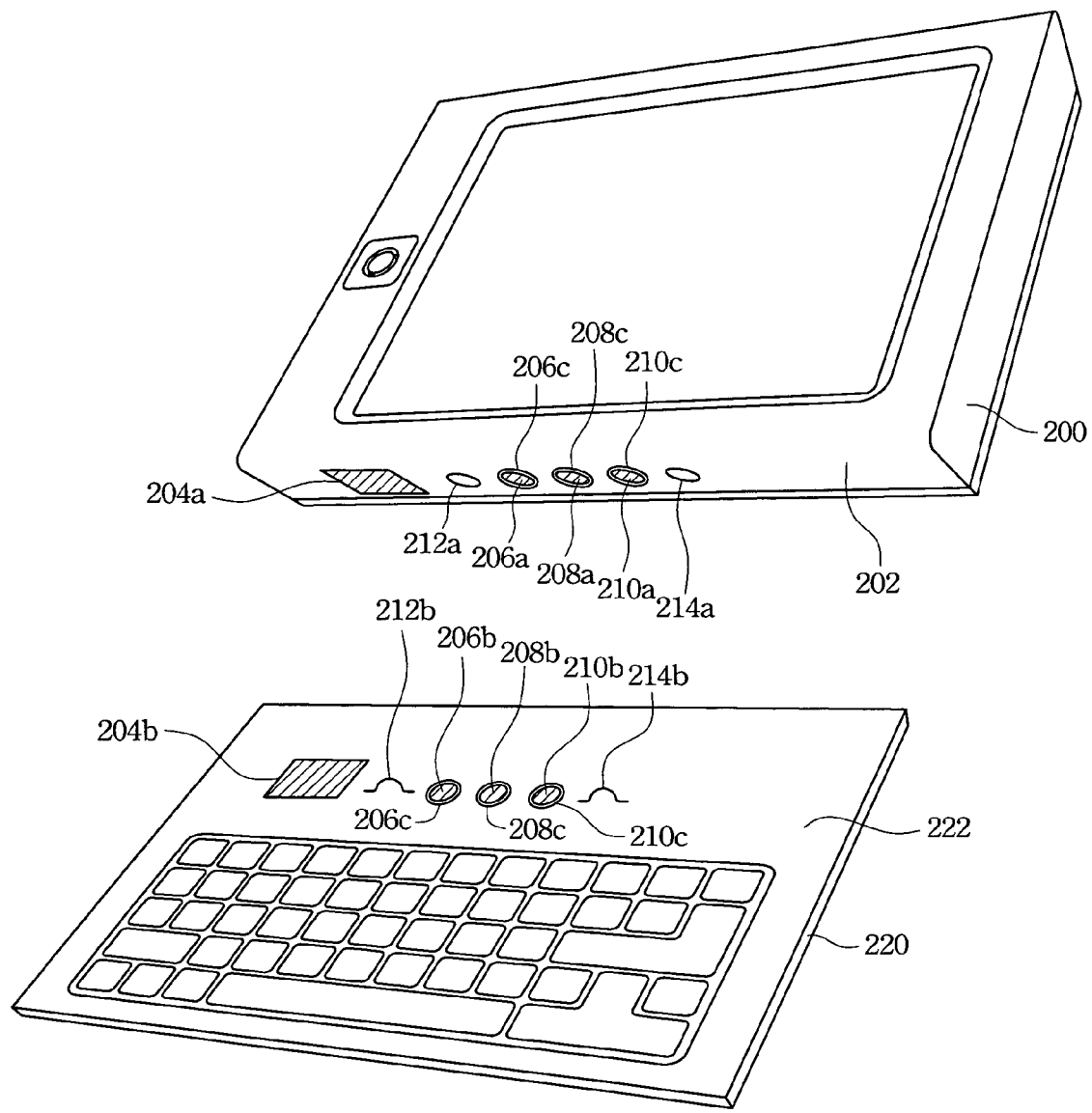
FIG. 2A is a diagram of an auto-aligning and connecting structure according to another preferred embodiment of this invention.

Another embodiment of the aligning and connecting structure of the present invention is shown in FIG. 2A. A portable electronic device 200 and its keyboard 220 are applied herein.

It is illustrated in FIG. 2A that there is a first contact 204a on the electronic device 200 for electrically coupling with a second contact 204b on the external keyboard 220. Hence the keyboard 220 is capable of transmitting and receiving signals to and from the electronic device 200. As displayed in FIG. 2A, the first contact 204a is located on the first surface 202 of the electronic device 200, and the second contact 204b on the second surface 222 of the keyboard 220. The alignment is even more important because the first contact 204a and the second contact 204b have to be in contact with each other for the keyboard 220 to function correctly.

As illustrated in the previous embodiment, there are a plurality of first magnetic units allocated on the first surface 202 of the electronic device 200 and a plurality of second magnetic units allocated on the second surface 222 of the electronic device 200; that is, the first magnetic units 206a, 208a and 210a are installed on the first surface 202 of the electronic device 200, and the second magnetic units 206b, 208b and 210b are installed on the second surface 222 of the keyboard 220. With the appropriate arrangement and design, these magnetic units are not only capable of attracting one another, but also able to connect the first contact 204a and the second contact 204b.

Figure 2B:
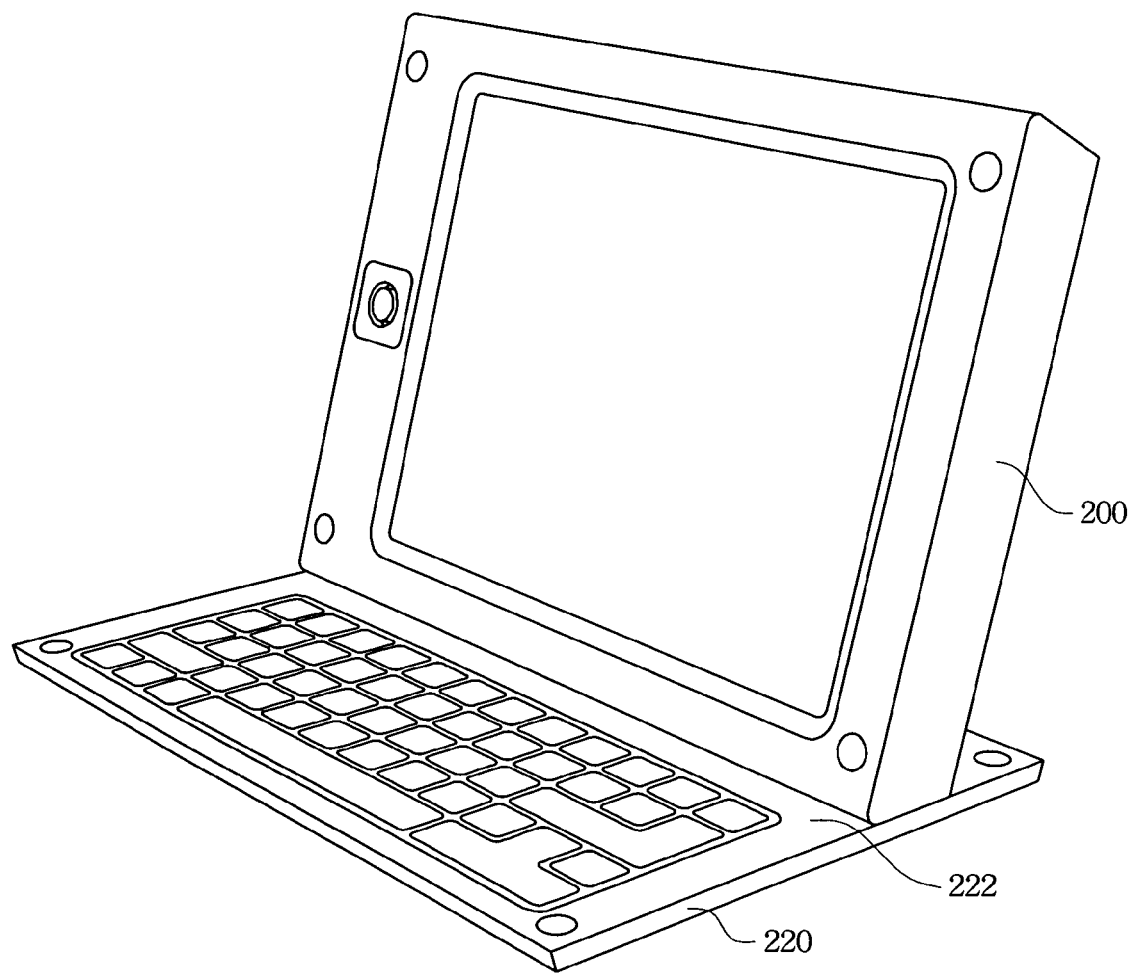
FIG. 2B is an assembly diagram of an electronic device and a keyboard according to one preferred embodiment of this invention.

For example, when the polarities of the first magnetic units 206a, 208a and 210a are positive, positive, and negative respectively, and the polarities of the second magnetic units 206b, 208b and 210b are negative, negative, and positive respectively, the electronic device 200 and the external keyboard 220 can couple to each other only when the first magnetic unit 206a and the second magnetic unit 206b, the first magnetic unit 208a and the second magnetic unit 208b, and the first magnetic unit 210a and the second magnetic unit 210b connect to each other respectively such that the first contact 204a and the second contact 204b are connected to each other as illustrated in FIG. 2B. Otherwise, the alignment and connection between the electronic device 200 and the keyboard 220 cannot be fulfilled.

As the connecting structure of the present invention may be applied to any kind of electronic device, it must be considered that the influence of magnetism on components inside the electronic device is inevitable, especially for some portable electronic devices with components of high integration density. Therefore, a magneto-resistance layer surrounds each magnetic unit of the present embodiment to decrease the influence of the magnetism from the magnetic units on the components inside the electronic device. For instance, the magneto-resistance layer 206c surrounding the magnetic units 206a and 206b concentrates the attractive magnetism so as not to interfere with other electronic components. The functions of the magneto-resistance layer 208c surrounding the magnetic units 208a and 208b, and the magneto-resistance layer 210c surrounding the magnetic units 210a and 210b are the same. Please note that the magneto-resistance layer can be made up of any kind of material that guides magnetism; metal, alloy, and ceramics are examples.

In addition, for the user to find the connecting position more quickly and more accurately, some non-magnetic assistant aligning structures are further installed around the magnetic units. For example, the first non-magnetic assistant aligning structures 212a and 214a are installed on the first surface 202, and the second non-magnetic assistant aligning structures 212b and 214b are installed on the second surface 222. In the present embodiment, the first non-magnetic assistant aligning structures 212a and 214a are concave structures, and the second non-magnetic assistant aligning structures 212b and 214b are convex structures that are able to be coupled with the first non-magnetic assistant aligning structures 212a and 214a respectively. Hence, the user can recognize the alignment position more easily and more clearly using these assistant aligning structures.

Although the present invention has been described in considerable detail with reference to certain preferred embodiments thereof, other embodiments are possible. For example, the numbers of the aforementioned magnetic units and assistant aligning structures are not limited to the present embodiments, and may be arranged and designed in various ways for different requirements. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device assembly, comprising: a portable electronic device with an electronic graphical display and a first contact; a freestanding keyboard accessory separated and detached from the portable electronic device, the keyboard accessory having a second contact that electrically couples with the first contact of the portable electronic device at a predetermined position and angle that creates a nearly perpendicular angle between the keyboard accessory and the display of the portable electronic device that exposes the display to a user of the keyboard accessory; and an auto-aligning and connecting structure for aligning and connecting the portable electronic device and the keyboard accessory at the predetermined position and angle, comprising: a plurality of multiple first magnetic units installed on a first surface of the portable electronic device; and a plurality of second magnetic units installed on a second surface of the accessory; wherein when the second surface approaches the first surface, at least one of the plurality of second magnetic units and one of the plurality of first magnetic units are aligned and mutually attracted such that the second surface is attracted to connect to the first surface, and then the second contact is electrically coupled to the first contact at the predetermined position and angle to expose the display.

2. The portable electronic device assembly of claim 1, wherein polarities of the plurality of multiple first magnetic units and the plurality of second magnetic units are configured so that a first subset of the plurality of multiple first magnetic units are attracted to a first subset of the plurality of multiple second magnetic units and are repulsed from a second subset of the plurality of multiple second magnetic units, so that the portable electronic device and the accessory can be coupled at the predetermined position and angle.

3. The portable electronic device assembly of claim 1, wherein the polarity of at least one of the plurality of first magnetic units is different from the polarity of the other first magnetic units.

4. The portable electronic device assembly of claim 1, wherein the polarity of at least one of the plurality of second magnetic units is different from the polarity of the other second magnetic units.

5. The portable electronic device assembly of claim 1, wherein the plurality of first magnetic units or the plurality of second magnetic units comprise magnetic material, magnetic susceptible material, or electromagnetic inductive material.

6. The portable electronic device assembly of claim 1, wherein a magneto-resistance layer surrounds at least one of the plurality of first magnetic units and/or at least one of the plurality of second magnetic units.

7. The portable electronic device assembly of claim 1, wherein the magneto-resistance layer comprises metal, alloy, or ceramics.

8. The portable electronic device assembly of claim 1, further comprising at least one first non-magnetic assistant aligning structure installed on the first surface, and at least one second non-magnetic assistant aligning structure installed on the second surface, wherein the first non-magnetic assistant aligning structure can be coupled with the second non-magnetic assistant aligning structure to indicate at least one connecting position of the accessory on the portable electronic device.

9. The portable electronic device assembly of claim 8, wherein the first non-magnetic assistant aligning structure comprises a concavity structure or a protrusion structure.

* * * * *